Oct. 12, 1954 — L. M. OBERLIN — 2,691,223
LIQUID LEVEL GAUGE
Filed Aug. 5, 1952 — 2 Sheets-Sheet 1

INVENTOR.
BY L. M. Oberlin
Hudson & Young
ATTORNEYS

Oct. 12, 1954     L. M. OBERLIN     2,691,223
LIQUID LEVEL GAUGE
Filed Aug. 5, 1952     2 Sheets-Sheet 2
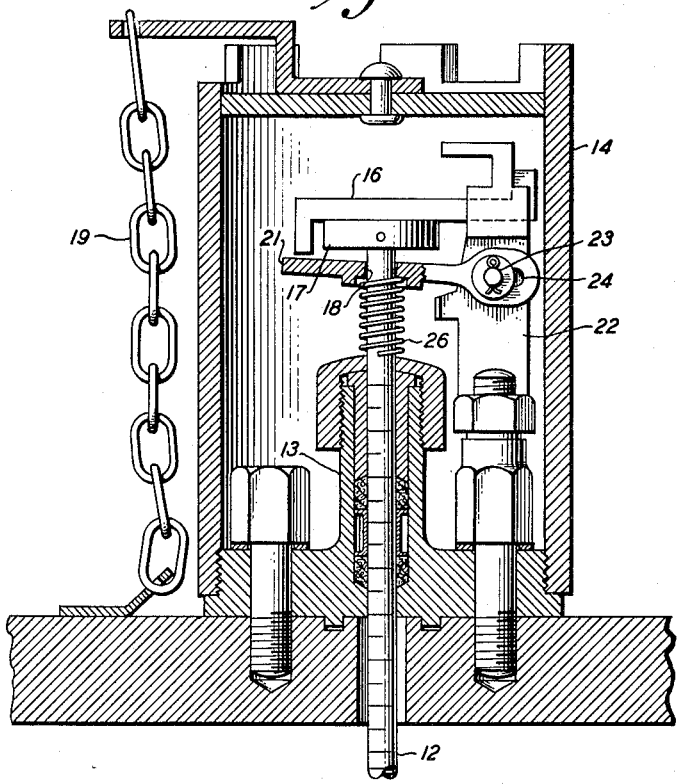
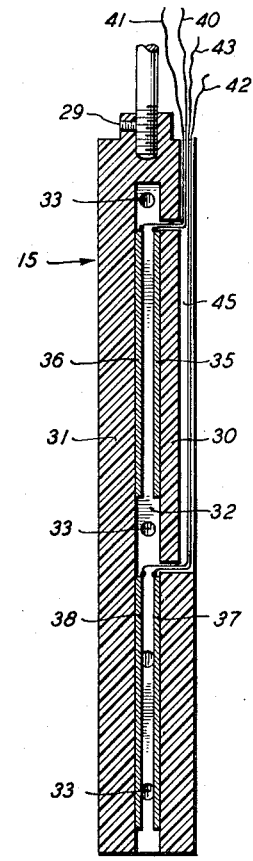
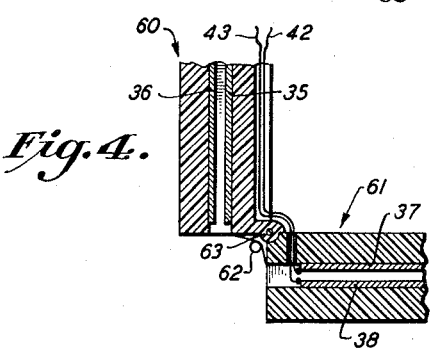
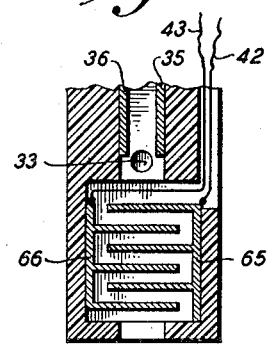
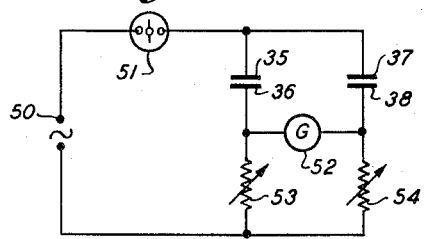
INVENTOR.
L. M. Oberlin
BY Hudson & Young
ATTORNEYS Patented Oct. 12, 1954

2,691,223

UNITED STATES PATENT OFFICE 2,691,223

LIQUID LEVEL GAUGE

Lyman M. Oberlin, Dewey, Okla., assignor to Phillips Petroleum Company, a corporation of Delaware Application August 5, 1952, Serial No. 302,718

10 Claims. (Cl. 33—126.7)

This invention relates to apparatus for measuring liquid levels. In another aspect it relates to apparatus in which the liquid level is determined by variation in capacitance between a pair of spaced condenser elements.

This application is a continuation-in-part of application Serial No. 98,348, filed June 10, 1949, now Patent No. 2,622,442.

In recent years the marketing of high vapor pressure hydrocarbons, such as propane and butane, has become a very active phase of the petroleum industry. These fuels are transported in liquid form, under high pressures, by means of specially constructed railroad tank cars.

In order to determine, when necessary, the amount of liquid hydrocarbon product contained in a tank car, so-called "liquid level slip-tube gauges" have been widely used. These devices consist of a hollow tube, slidably entering the shell of the tank car through a suitable packing gland in the dome of the car. The tube is fitted at its lower end with a check valve having a small orifice, and at its upper end with a shut-off valve. The outside of the tube is marked in inches and fractions of inches, and a suitable reference pointer is attached to the shell of the car, or to its dome. When the inner end of the tube is immersed in the liquid and the shut-off valve is opened, a fine spray issues from the vented end thereof, whereas when the inner end of the tube is disposed in the gas above the liquid a distinctive vapor issues from the vented end of the tube. Thus by manipulating the tube an operator can determine the liquid level within the tank by noting the slip tube position at which a change in the character of the issued vapor takes place.

A serious disadvantage to the use of these slip tube gauges, however, resides in the fact that the material being measured and its vapor escape into the atmosphere whenever a liquid level determination is made thereby creating a dangerous explosion hazard. In order to overcome this difficulty there is provided in accordance with the present invention an improved type of gauge wherein the liquid level is determined by a measurement of the capicitance between spaced plates disposed within the liquid being measured, thus affording a liquid level determination without the escape of any of the measured liquid or its vapor.

It is an object of the present invention to provide apparatus for measuring a liquid level which is free from the disadvantages encountered in prior systems.

It is a further object to provide apparatus in which the liquid whose level is being measured constitutes a condenser dielectric whereby changes in liquid level produce respective changes in capacitance between a set of spaced condenser elements.

It is a further object to provide a liquid level indicator which is simple in construction, reliable in operation, rugged and durable.

Various other objects, advantages and features of this invention should become apparent to those skilled in the art from the following detailed description taken in conjunction with the accompanying drawings in which:

Figure 2 is an enlarged detailed view of the upper portion of the liquid level gauge of this invention;

Figure 3 is a vertical sectional view of the lower portion of the liquid level gauge in this invention;

Figure 4 is a vertical sectional view of a modification of the invention;

Figure 5 is a vertical sectional view of a second modification of the invention; and Figure 6 is a schematic view of the electrical circuitry employed in conjunction with the liquid level gauge.

Figure 1:
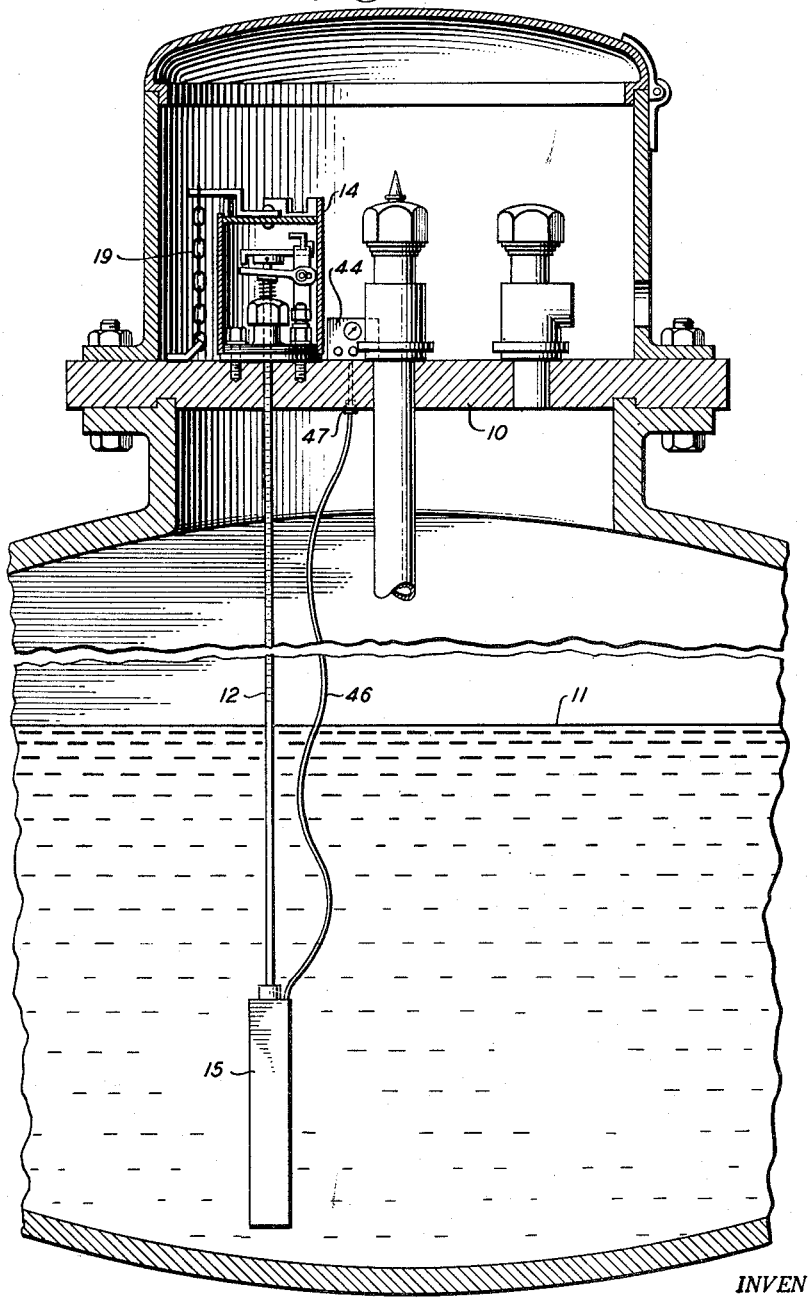
Figure 1 is a fragmentary vertical section of a high pressure tank car in which this invention and other necessary valves and accessories appear in outline.

Referring now to the drawing in detail and to Figures 1 and 2 in particular, the numeral 10 designates the central section of the tank shell which is filled with liquified petroleum gas to the level denoted by the surface 11. A gauge tube 12 slidably enters the top of the tank through a lantern gland 13 and its upper end extends into the gauge housing 14. A casing 15 enclosing two pair of spaced capacitor plates is attached to the lower end of tube 12. Tube 12 normally is maintained in the position illustrated by means of a hold-down arm 16 which is mounted within housing 14 so as to be capable of rotation in a horizontal plane. The upper end of tube 12 is provided with a flange member 17 which normally is in engagement with the lower edge of hold-down arm 16. A horizontal edge of arm 16 can serve as a reference pointer in measuring the liquid level with reference to the graduations appearing on the upper portion of tube 12. In transit, arm 16 is located by suitable means which position it over flange 17, thus retaining gauge tube 12 substantially within the interior of the tank. Whenever a determination of the liquid level in the tank is made chain 19 is unfastened and gauge housing 14 removed. Hold-down arm 16 then is swung aside allowing gauge tube 12 to be raised out of the tank. In order to prevent tube 12 from being expelled rapidly from the tank by the pressure therein, a restraining arm 21 disposed in approximately horizontal position is pivotally mounted on a stanchion 22 by means of a pin 23 disposed in a slot 24. This pivotal mounting permits angular movement of arm 21 in a vertical plane. A hole 18 is provided in arm 21 such that rod 12 is free to move therethrough whenever restraining arm 21 is in a horizontal position. A spring 26, however, normally urges rod 21 upward away from the horizontal position which results in the introduction of friction and binding between the gauge tube and the restraining arm. The extended end of arm 21 serves as a handle or grip. By lowering the extended end of arm 21 the friction between rod 12 and arm 21 is removed and gauge 12 can be raised or lowered with respect to the tank. Other valves necessary to the use, maintenance and protection of a typical tank car are shown within the dome housing, but are not described in detail because they form no part of the present invention and are described in U. S. Patents 1,827,574 and 2,361,872.

In Figure 3 casing 15 which is attached to the lower end of rod 12 by screws such as 29 is illustrated in greater detail. This casing is formed by elongated support members 30 and 31 joined by transverse supports, one of which is shown at 32, the latter being provided with openings 33. Support members 30, 31 carry a first pair of elongated relatively narrow metal strips 35, 36, respectively, mounted in facing, closely spaced, parallel arrangement. A second pair of relatively narrow metal strips 37, 38 are mounted in facing, closely spaced, parallel arrangement on respective members 30, 31 below strips 35, 36. The two sets of strips preferably are the same length although this is not essential for proper functioning of the apparatus. Electrical leads 40, 41, 42 and 43 connect respective plates 35, 36, 37 and 38 to the bridge circuit illustrated in Figure 6 which is disposed outside of the fluid tank in a housing 44 mounted on plate 10. Leads 40, 41, 42 and 43 pass through a passage 45 in casing 15 and are enclosed within a suitable flexible fluid-tight conduit 46 which is connected between casing 15 and the housing 44 disposed on plate 10. Conduit 46 passes through a small opening in plate 10 which is provided with a suitable sealing device 47. A plurality of openings 33 are provided in casing 15 to admit liquid into the interior of the casing such that the liquid level within casing 15 is always the same as the liquid level outside the casing. It should thus be apparent that metal strips 35, 36 form a first pair of spaced condenser elements and strips 37, 38 form a second pair of spaced condenser elements. If these spaced elements are immersed within the liquid, the liquid forms the dielectric between said elements; and if the elements are in the region of vapor above the liquid, this vapor forms the dielectric material between said elements. If the liquid in the tank is electrically conductive the strips can be coated with a thin layer of insulating material. In such case the term "dielectric material" as used herein still refers to the liquid between the layers of insulating material.

A suitable bridge circuit adapted to compare the capacitance between plates 35, 36 with the capacitance between plates 37, 38 is illustrated in Figure 6. The bridge components include an alternating current source 50, a switch 51, a galvanometer 52 and variable balance resistors 53 and 54. The condenser formed by plates 35, 36 forms one arm of the Wheatstone bridge circuit and the condenser formed by plates 37, 38 forms a second arm of the bridge circuit; resistors 53 and 54 form the third and fourth arms of the bridge circuit.

In operation of the capacitive type gauge herein described, casing 15 first is raised and then slowly lowered into the liquid under measurement until the bridge circuit is balanced, that is, at which time the capacitance between plates 35, 36 is equal to the capacitance between plates 37, 38. This is indicated by a zero deflection of galvanometer 52 if resistors 53 and 54 have equal impedance. Before balance is obtained a portion of the space between plates 35, 36 is filled with the vapor above the liquid, which vapor has a dielectric constant different from the dielectric constant of the liquid. At the point where balance is obtained it is known that the liquid level 11 is at the top end of plates 35, 36 and the depth of level 11 is read on the graduated scale of rod 12. It should be noted that successful operation of this gauge does not depend in any way upon the dielectric constant of the liquid under measurement since the same liquid forms the dielectric of both condenser units.

As previously stated, the bridge circuit is balanced when the liquid level reaches the upper end of plates 35, 36. However, if the depth of the liquid is not sufficient to reach the top end of plates 35, 36 the bridge circuit can be adjusted for balance when a preselected relationship exists between the capacitance of the condenser units rather than when the capacitances are equal. This is accomplished by suitable calibration of galvanometer 52 or adjustable resistors 53, 54. It is, of course, impossible with the embodiment of Figure 3 to determine the depth of the liquid level if said liquid level is below plates 35, 36. This difficulty can be overcome, however, by employing the apparatus of Figure 4 in which two casing members 60 and 61 are connected by a hinge 63. Casing section 60 carries plates 35, 36 and casing section 61 carries plates 37, 38. The two casing sections preferably are biased by a spring 62 to a position wherein one section is perpendicular to the other which results in plates 37, 38 always being immersed in the liquid being measured. With this modification readings can be taken accurately even where the liquid level is quite low because the plates 37, 38 are positioned much closer to the bottom of the tank.

A still further modification of this invention which is adapted to accomplish the same purpose as the modification of Figure 4 is illustrated in Figure 5. In this embodiment a pair of interleaved multiple capacitor plate elements 65 and 66 are mounted immediately under plates 35, 36. Plates 65 and 66 correspond to respective plates 37 and 38 in Figure 3 except that by interleaving the several plates of 65, 66 a capacitance equal to the capacitance between plates 35, 36 is obtained in a much narrower space thereby permitting casing 15 to be lowered further in the tank.

From the foregoing description it should be apparent that there is provided in accordance with the present invention a liquid level indicator utilizing the dielectric property of the liquid whose level is to be measured as a means for determining its depth. The accuracy of the reading is not affected by the dielectric constant of the liquid and no calibration thereof is required when liquids of differing dielectric constants are stored at different times in a single tank. The gauge herein provided is particularly adapted for use in measuring the liquid level in tank cars carrying liquefied petroleum gases. In this respect readings can be obtained without venting the measured material into the atmosphere. It should be apparent, however, that while this invention has been described in conjunction with measuring the liquid level in tank cars, the principles described are applicable to measuring liquids in any type container.

While this invention has been described in connection with present preferred embodiments thereof, it is to be understood that this description is illustrative only and is not intended to limit the invention.

What is claimed is:

1. Apparatus for measuring a liquid level comprising, in combination, two units each including a pair of spaced condenser elements, the liquid whose level is to be measured constituting substantially the entire dielectric material for one of said units, means for moving the other unit into and out of said liquid, a scale for measuring the position of said other unit, and means for comparing the electrical capacitance of said units, said scale indicating the liquid level when a predetermined relation exists between the capacitance of said units.

2. Apparatus for measuring a liquid level comprising, in combination, a casing, two pairs of elongated relatively narrow metal plates mounted within said casing in closely spaced parallel arrangement, one pair of plates being mounted above the other pair of plates, said casing being perforated to allow flow of liquid into and out of the casing, means for raising and lowering said casing in a liquid whose depth is to be ascertained, said means including a scale for indicating the position of the casing, and means for comparing the electrical capacitance of said units, said scale indicating the liquid level when a predetermined relation exists between the capacitance of said units.

3. Apparatus in accordance with claim 2 in which the spacing between and the relative areas of said two sets of plates are such that the capacitances between said two sets of plates are equal when materials having like dielectric constants are disposed between said two sets of plates.

4. Apparatus in accordance with claim 2 in which said two sets of plates are of equal length, said sets of plates have equal areas opposing one another, the individual plates of said two sets being equally spaced, and said scale indicating the liquid level when the capacitance of said pairs of plates is equal.

5. Apparatus in accordance with claim 4 in which the comparing means is an alternating current Wheatstone bridge circuit, said pairs of condenser plates forming two arms of the Wheatstone bridge circuit.

6. Apparatus for measuring a liquid level, comprising, in combination, a hinged casing including an upper section and a lower section, a set of condenser elements mounted in the upper section, a set of condenser elements mounted in the lower section, each set including two elongated relatively narrow metal plates arranged in closely spaced parallel formation, means for immersing said casing in a liquid whose depth is to be measured, said means including a scale for indicating the position of the casing in the liquid, means for comparing the electrical capacitance of said sets of condenser elements, said scale indicating the liquid level when a predetermined relation exists between the capacitance of said sets of condenser elements, and means for urging the two sections of the casing to predetermined relative positions so that the upper section may be lowered substantially to the bottom of the tank while the lower section remains immersed in said liquid.

7. Apparatus in accordance with claim 6 in which the two sets of metal plates are of the same length, said scale indicating the liquid level when the capacitance of the condenser units is equal, and in which the balancing means comprises an alternating current Wheatstone bridge circuit, the two sets of condenser elements forming two arms of the bridge circuit.

8. Apparatus for measuring a liquid level comprising, in combination, a casing including an upper section and a lower section, a first set of condenser elements mounted in said upper section, said first set including two elongated relatively narrow metal plates arranged in closely spaced parallel formation, a second set of condenser elements mounted in said lower section, said second set including two interleaved metal plates arranged in closely spaced relationship whereby the capacitance of said first set of condenser elements is approximately equal to the capacitance of said second set of condenser elements when materials having like dielectric constants are disposed between said two sets of plates, means for immersing said casing in a liquid whose depth is to be measured, said means including a scale for indicating the position of the casing in the liquid, and means for comparing the electrical capacitance of said sets of condenser elements, said scale indicating the liquid level when a predetermined relation exists between the capacitance of said sets of condenser elements.

9. Apparatus in accordance with claim 8 in which the comparing means is an alternating current Wheatstone bridge circuit, said pairs of condenser plates forming two arms of the Wheatstone bridge circuit.

10. Apparatus for measuring the liquid level in a tank adapted to contain liquified petroleum gas comprising, in combination, a casing including an upper and a lower section, a set of capacitor elements mounted in each of said sections, said casing being perforated to allow flow of liquid into and out of said casing to form the dielectric material between said capacitor elements, a rod secured at one end to said casing to raise and lower said casing in said tank, a scale associated with said rod to indicate the position of said casing in said tank, an alternating current bridge circuit positioned outside said tank, and electrical leads connecting said sets of capacitor elements in two arms of said bridge circuit whereby said scale indicates the liquid level when a predetermined relation exists between the capacitance of said sets of capacitor elements.

References Cited in the file of this patent

UNITED STATES PATENTS

| Number | Name | Date |
|---|---|---|
| 1,695,701 | Steiner | Dec. 18, 1928 |
| 2,032,016 | Hitner | Feb. 25, 1936 |
| 2,357,023 | Reid et al. | Aug. 29, 1944 |
| 2,480,490 | Mark | Aug. 30, 1949 |
| 2,511,398 | De Giers | June 13, 1950 |
| 2,541,743 | Brockman | Feb. 13, 1951 |
| 2,581,085 | Edelman | Jan. 1, 1952 |